United States Patent
Patnaikuni et al.

(10) Patent No.: US 12,136,331 B2
(45) Date of Patent: Nov. 5, 2024

(54) ROBOTIC PROTECTION BARRIER

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 896 days.

(21) Appl. No.: 17/213,109

(22) Filed: Mar. 25, 2021

(65) Prior Publication Data

US 2022/0309855 A1   Sep. 29, 2022

(51) Int. Cl.
  *G08B 21/04*   (2006.01)
  *G16Y 10/75*   (2020.01)
  *G16Y 40/60*   (2020.01)
  *G16Y 40/50*   (2020.01)

(52) U.S. Cl.
  CPC .......... *G08B 21/0476* (2013.01); *G16Y 10/75* (2020.01); *G16Y 40/60* (2020.01); *G16Y 40/50* (2020.01)

(58) Field of Classification Search
  CPC .... G08B 21/0476; G16Y 10/75; G16Y 40/60; G16Y 40/50
  USPC ...................................................... 340/573.1
  See application file for complete search history.

(56) References Cited

U.S. PATENT DOCUMENTS

| | | | | |
|---|---|---|---|---|
| 11,620,581 B2* | 4/2023 | Givental | ................. | G06F 18/22 |
| | | | | 706/12 |
| 11,620,879 B2* | 4/2023 | Zalewski | ............. | G07G 1/0072 |
| | | | | 705/26.8 |
| 11,636,359 B2* | 4/2023 | Laughlin | ................... | F16P 3/14 |
| | | | | 706/12 |
| 2005/0172411 A1* | 8/2005 | Snedeker | ............. | A47D 13/027 |
| | | | | 5/655 |
| 2012/0062735 A1* | 3/2012 | Rivera | ............... | G08B 21/0476 |
| | | | | 348/143 |

(Continued)

OTHER PUBLICATIONS

"Risk Evaluation and Prevention System and Method for Smart Spaces", IP.com No. IPCOM000263737D, IP.com Electronic Publication Date: Sep. 30, 2020, 4 pps., <https://priorart.ip.com/IPCOM/000263737>.

*Primary Examiner* — Kerri L McNally
*Assistant Examiner* — Thang D Tran
(74) *Attorney, Agent, or Firm* — Rakesh Roy

(57) ABSTRACT

A method generates a fence as a barrier between a user and an area of risk conditions within a designated space. One or more processors recognize an area of risk conditions, based a machine learning model trained by pre-determined indicators of the risk conditions and areas within the designated space. Movement patterns of a user are determined, based on machine learning of video images of the user's movements and behaviors. A risk condition is detected, based on the machine learning training of pre-determined areas and the pre-determined indicators of the risk conditions. Responsive to determining the user within or approaching the area of risk conditions, deploying, by the one or more processors, one or more mobile IoT devices as a fence between the user and the area of risk conditions, and generating a distraction diverting the user away from the area of the risk condition.

20 Claims, 3 Drawing Sheets

(56) References Cited

U.S. PATENT DOCUMENTS

| | | | |
|---|---|---|---|
| 2014/0279733 A1* | 9/2014 | Djugash | B25J 19/023 |
| | | | 901/46 |
| 2015/0288877 A1* | 10/2015 | Glazer | H04N 7/183 |
| | | | 348/77 |
| 2016/0077526 A1* | 3/2016 | Sisbot | G06Q 50/01 |
| | | | 901/1 |
| 2016/0093207 A1* | 3/2016 | Di Censo | G08G 1/005 |
| | | | 340/944 |
| 2018/0232904 A1* | 8/2018 | Zakharevich | G06T 7/70 |
| 2019/0053638 A1* | 2/2019 | Chien | A47D 15/003 |
| 2019/0077007 A1* | 3/2019 | Mallinson | A61B 5/1128 |
| 2019/0130720 A1* | 5/2019 | Lui | G06V 10/82 |
| 2020/0001461 A1* | 1/2020 | Cappello | B25J 9/0003 |
| 2020/0051422 A1* | 2/2020 | Maeng | H04N 7/181 |
| 2020/0094403 A1* | 3/2020 | Kuffner | H04W 4/30 |
| 2020/0327768 A1* | 10/2020 | Rossano | B25J 19/06 |
| 2020/0346350 A1* | 11/2020 | Keselman | G06T 19/006 |
| 2020/0358925 A1* | 11/2020 | Hall | H04N 7/181 |
| 2021/0097294 A1* | 4/2021 | Narayanmurthy | G06V 40/20 |
| 2021/0201391 A1* | 7/2021 | Metev | G06V 40/10 |
| 2022/0155092 A1* | 5/2022 | Lam | G05D 1/0217 |
| 2022/0300786 A1* | 9/2022 | Krishna Murthy | G08B 7/06 |
| 2023/0137097 A1* | 5/2023 | Su | G06N 20/10 |
| | | | 706/12 |
| 2023/0230140 A1* | 7/2023 | Rugel | G06Q 30/0627 |
| | | | 702/182 |

\* cited by examiner

ROBOTIC PROTECTION BARRIER

FIELD OF THE INVENTION

The present invention relates generally to the field of accident avoidance, and more particularly to generating a barrier fence between a user and an area of risk conditions using IoT robotic devices.

BACKGROUND OF THE INVENTION

The Internet of things (IoT) describes a classification of physical objects, referred to as the "things", that include among other technologies, sensors, software, and components enabling network connection to the Internet. The interconnection provides a technology that often includes the description of "smart", such as a smart appliance, a smart light fixture, a smart thermostat, a smart security system, and a smart home, as well as having similar commercial building utility. IoT objects can include mobile items such as auto-cleaning machines, toys, vehicles, and recreational items. IoT objects, or sometimes referred to as IoT devices, can collect and transmit data, as well as receive data or control-based instructions.

SUMMARY

Embodiments of the present invention disclose a computer-implemented method, computer program product, and system for forming a barrier between a user and an area of risk conditions. The computer-implemented method provides for one or more processors to train a machine learning model to recognize an area of risk conditions, based on pre-determined indicators of the risk conditions and pre-defined areas. The one or more processors determine the movement patterns of a user, based on machine learning of video images of the user's movements and behaviors. The one or more processors detect a risk condition, based on the machine learning training of pre-defined areas and the pre-determined indicators of the risk conditions. Responsive to determining the user approaching the area of risk conditions, the one or more processors deploy one or more mobile IoT devices as a barrier between the user and the area of risk conditions, and a distraction is generated directing the user away from the area of risk conditions. Responsive to determining movements of the user approaching the area of the risk condition, the one or more processors adjusting positions of the one or more IoT devices to maintain the fence as a barrier between the user and the area of the risk condition.

DETAILED DESCRIPTION

Figure 1:
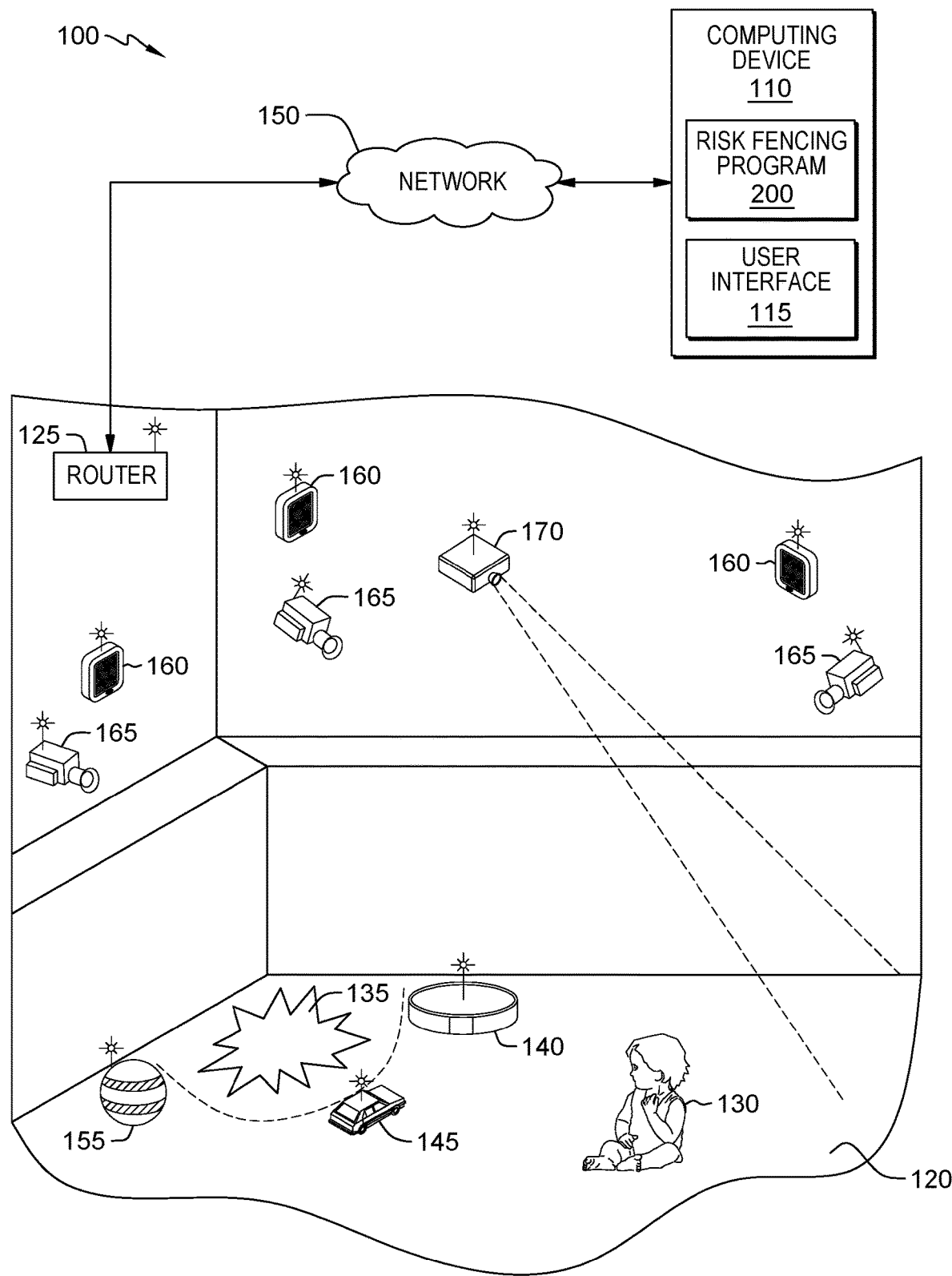
FIG. 1 is a functional block diagram illustrating a distributed computer processing environment, in accordance with an embodiment of the present invention.

Embodiments of the present invention recognize that risk conditions can develop or occur in almost any environment or surrounding. Risk conditions can pose a threat of harm or injury to users located in or moving into an area in which the risk conditions exist. Risk conditions can include potential exposure to different items or attributes of an area occupied or accessed by one or more users. Risk conditions can include, but are not limited to, broken items exposed as sharp objects, hot items that can inflict burns, exposed electrical circuitry, slippery walking surfaces, unstable structures, open stairwells, lighting failure, and spills of harmful chemical exposure.

In some embodiments, the area of risk conditions can occur in household environments, whereas in other embodiments, the area of risk conditions can occur in larger building settings, such as stores, hotels, transportation staging areas, restaurants, as well as other areas. Embodiments of the present invention recognize that attention and awareness of areas of risk conditions rely on personal alertness or notification by other users or alert messages. The effectiveness of personal alertness or notification depends on whether the user receiving the notification or alert recognizes and understands the alert. Some embodiments recognize that the user approaching an area of risk conditions does not receive, acknowledge, or understand an alert or notification and, therefore, the risk condition presents potential harm to the user.

For example, an infant (i.e., user) crawling in a household room in which an object made of glass has fallen, and the broken sharp pieces present a serious risk condition to an unsupervised infant. Similarly, a toddler or child (i.e., user) may approach a pan on a stove with boiling contents without detection by an adult in the room. The hot liquid in the pan presents a risk condition that can cause serious harm. Embodiments also recognize that areas with warning alerts providing audio or visual alerts may not be recognized by users with hearing, or visual impairments. Embodiments also recognize that a user's pet failing to recognize a risk condition within an area may be harmed or injured. Users that approach an unrecognized risk condition may experience harm or injury from moving into an area of risk condition if not impeded in some manner.

Embodiments of the present invention provide a computer-implemented method, computer program product, and computer system for forming a fence between a user and an area of risk condition in which positioning of one or more Internet of things (IoT) devices form the fence as a barrier. Embodiments provide a practical solution to a problem in which a user fails to recognize a risk condition within a designated area by forming a physical fence between the user and the area of risk condition.

In some embodiments, a machine learning model that receives data input from the monitoring of the area recognizes a risk condition based on pre-defined indications submitted during the training of the machine learning model. In some embodiments, the training includes supervised learning using video images of risk conditions, such as broken glass, sharp-edged objects, liquid spills, sensor input of risk conditions, such as infrared detection of hot objects, and audio input of risk conditions, such as sounds of breakage and structural failure. In an embodiment, the machine learning model training includes images, and sensor input of a predefined area during conditions absent of risk.

In some embodiments of the present invention, the computer-implemented method includes a machine learning model trained to recognize users and user's movements within or accessing a designated space, by submitting user movement video and audio within the designated space as training input. In some embodiments, the training includes determining a rate of movement of the user, contributing to a determination of response time to form a barrier between the user and the risk condition in response to detection of the risk condition within the area. In other embodiments, the machine learning model training includes a plurality of behavioral examples of the user within the designated space and indicating the potential effectiveness of audio and visual projections as a source of distraction and attention, based on the response of the user.

In one embodiment of the present invention, the computer-implemented method utilizes video cameras, microphones, audio speakers enabled with microphones, cameras, and various sensors to monitor and receive data corresponding to the designated space to recognize risk conditions and the presence and movements of a user within the designated space. In some embodiments, the computer-implemented method identifies a user and determines the movement and ability level of the identified user, based on historical monitoring of users and supervised learning categorizing a user's identification. The computer-implemented method determines whether the size and movement of the user indicate an infant, toddler, teenager, or adult, based on size and movement by crawling or upright movement. Embodiments determine whether the identified user moves in a direction towards the risk condition indicating a potential threat to the user's safety and well-being.

In an embodiment of the present invention, one or more processors of a computing device, receiving input data of the designated space, detects a risk condition based on image, audio, or sensor data corresponding to a risk condition as identified by the trained machine learning model. Detection of the risk condition may be based on an image received as input from video monitoring of the designated space and may combine with audio data received or sensor data received, with the input compared to training data input. For example, the image received may depict multiple objects scattered on a floor surface, and each object of varying size and shape with a high amount of light reflection. The audio data may include a sharp sound of an object striking another object, recognized as breakage. The machine learning model interprets the combination of input data received as an object falling and breaking into sharp-edged pieces and posing a risk condition. In other examples, sensors may indicate excessive heat as a risk condition within the designated space.

In an embodiment of the present invention, one or more processors of a computing device, performing a risk fencing program, deploys one or more mobile IoT devices to positions that intervene between the user and the area of risk condition, in response to determining the user approaching the risk condition. The deployment of the IoT device(s) positions the mobile IoT devices to impede the movement of the user towards the risk condition. One or more IoT devices receive instruction to move to positions that form a fence or barrier between the user and the risk condition within the designated space. The IoT devices wirelessly communicate with a computing device and receive instructions from one or more processors of the computing device performing the risk fencing program to move to positions that impede the movement of the user approaching the risk condition in the designated space.

In an example, embodiments of the present invention send directional commands to the IoT devices and monitor movement of the IoT devices through input received from monitoring cameras. Embodiments send adjustment commands, based on the monitored movements of the IoT devices, positioning each device to form a physical fence barrier to the area of risk condition. For example, a method sends instruction to an IoT device to move forward for 18 seconds, then turn 45 degrees to the right and proceed for 10 seconds, then turn 30 degrees and continue for another 5 seconds and stop. Each command based on the position of the IoT device at the end of the previous command.

In some embodiments, the IoT devices, subsequent to forming a fence between the risk condition and the user, continue to adjust position and maintain the fence as the user's movement adjusts, impeding the user's advance towards the risk condition. Embodiments of the method adjust the position of the IoT devices, based on video input monitoring the user in the designated space and instructions from the risk fencing program operating on the computing device, responding to the received input of the movements of the user.

In one embodiment, subsequent to forming the fence as a barrier between the user and the risk condition detected in the designated space, the one or more processors transmit instruction from the risk fencing program to at least one IoT device to generate a distraction that directs the attention of the user away from the risk condition. In some embodiments, the method determines an appropriate distraction for the user, based on the machine learning of the behavior and reaction of the user to a certain stimulus, such as a particular sound, display of lights, activation of a robotic IoT device, a projected hologram, or any combination of stimuli. In some embodiments, generating the distraction includes emitting an attracting audio signal from a direction away from the area of risk condition, which may be a familiar guiding voice, or a favorite sound or music, for example. Enabling devices may include a set of speakers positioned in representative directions of the designated space, a light projector, which can fully illuminate the risk condition area for awareness or project a distracting light display diverting the attention of the user. In some embodiments, a hologram projector provides an image diverting the movement of the user away from the risk condition.

In some embodiments, the method calculates a safe distance, based on the detected risk condition and the identification and position of the user. The method sends instructions to the IoT devices to assume positions that establish the determined safe distance. In some embodiments, the method determines whether the number of available IoT devices to form the fence between the risk area and the user are adequate and augments the fence by adding light-based fencing and/or holographic images to the fencing barrier. In some embodiments, the light-based fencing also illuminates the risk area, providing user awareness.

In yet other embodiments, the identification of the user includes determining a skill level of the user based on recognition of credentials or attributes of the user. For example, a firefighter may be recognized by fire-fighting attire or a badge credential, and a medical technician may be recognized by credentials or medical treatment accessories. Embodiments adjust the fencing based on recognition of the skill level and identification of the user in the designated space, such as allowing the skilled user access to the area of risk condition.

Embodiments of the present invention solve the problem of a user inadvertently being harmed or injured by a risk condition in a designated space, by forming a physical barrier between the user and the risk condition and generating a distraction directing the user away from the risk condition. The embodiments utilize one or more IoT devices directed by a risk fencing program. Some embodiments may not have all potential advantages of audio distractions, light displays, or holograms to reinforce the impeding barrier or distract away from the risk condition; however, all embodiments do not require all potential advantages.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes computing device 110, router 125, IoT device 140, IoT device 145, IoT device 155, speakers 160, cameras 165, and projector 170, interconnected via network 150. Distributed computer processing environment 100 also includes designated space 120, risk condition 135, and user 130. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission.

Computing device 110 includes user interface 115 and risk fencing program 200. In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a wearable item or included in a wearable item of a user, such as AR glasses. In still other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with other devices (shown and not shown) in distributed computer processing environment 100, via network 150, as well as performing operations of risk fencing program 200. Alternatively, in some embodiments, computing device 110 may be communicatively connected to risk fencing program 200, operating remotely. Computing device 110 may include internal and external hardware components, depicted in more detail in FIG. 3.

User interface 115 provides an interface to access the features and functions of computing device 110. In some embodiments of the present invention, user interface 115 provides access to operate and select options for risk fencing program 200 and may also support initiating supporting training of a machine learning model component of risk fencing program 200. User interface 115 may also provide access and operation controls of other applications, features, and functions of computing device 110 (not shown). In some embodiments, user interface 115 provides display output and input functions for computing device 110. In other embodiments, user interface 115 provides display output and enables the selection of options and functions associated with risk fencing program 200 operating on computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Risk fencing program 200 is an application for forming a physical fence between a user and a determined risk condition within a designated space. Risk fencing program 200 recognizes risk conditions and identifies categories of users, based on a machine learning module trained on risk condition example data and users' size and movement behaviors. In some embodiments, risk fencing program 200 receives video and audio input data of a designated space and monitors the designated space for an occurrence of a risk condition. In response to determining an area of risk condition within the designated space, risk fencing program 200 activates one or more wirelessly connected mobile IoT devices and positions the IoT devices to form a physical fence as a barrier to the area of risk condition. In some embodiments, risk fencing program 200 identifies whether a user occupies the designated space or approaches an entry to the designated space. Risk fencing program 200 identifies the user by categorizing the user as an infant, a child, an adult, and determines the movement ability of the user based on the identification, and historic monitoring data of the user while within the designated space, as part of the training and learning of the machine learning model of risk fencing program 200.

In some embodiments, risk fencing program 200 generates a distraction to divert the user away from the area of risk condition and may use audio generation and/or visual light projections as the distractions. In other embodiments, risk fencing program 200 projects light images and/or holograms to augment the appearance of the fence formed with the IoT devices. In some embodiments, risk fencing program 200 monitors the movements of the user in the designated space and adjusts the positions of the one or more IoT devices to maintain a barrier that impedes the user from the area of the risk condition to correspond to the movements of the user. In response to determining the elimination or resolution of the risk condition, risk fencing program 200 removes the fencing by returning the one or more IoT devices to a pre-determined position and discontinues producing the distractions.

Designated space 120 is a defined area in which a user can access and move about. In various embodiments, designated space 120 includes enclosed areas, such as a room in a building, a section of a larger space within a building, or a stairwell, an escalator, an elevator, a hallway, a balcony, or other area defined by walls, railings, or other separation objects. In still other embodiments, designated space 120 may be an outdoor area in which the enabling components of distributed computer processing environment 100 can be positioned and operated. In some embodiments, designated space 120 includes entry access devices (not shown), such as a lockable door, or entry authentication devices, which may function as a fence impeding entry to designated space 120 in response to risk fencing program 200 detecting risk condition 135.

Router 125 provides wireless connectivity between IoT devices 140, 145, and 155, speakers 160, cameras 165, and projector 170, and risk fencing program 200, operating on computing device 110, via connection to network 150. Router 125 receives data from speakers 160, which include microphones to receive audio input (not shown), and from cameras 165. Router 125 sends instructions wirelessly to projector 170, speakers 160, and IoT devices 140, 145, and 155.

User 130 represents a person or pet present or accessing designated space 120 within distributed computer processing environment 100. User 130 moves within designated space 120 and can be harmed or injured in the presence of risk condition 135. In some embodiments, the risk fencing program 200 determines user 130 as an infant, based on user 130 moving by crawling in designated space 120. In other embodiments, risk fencing program 200 determines the type of user for user 130 as a toddler, adolescent, teen, or adult accessing or moving within designated space 120. In still other embodiments, user 130 is challenged with impaired hearing and/or vision, making user 130 unable to recognize or be aware of risk condition 135. In still other embodiments, the method determines user 130's identity as a pet within designated space 120 and that risk condition 135 poses a threat of harm or injury to user 130.

Risk condition 135 represents a condition within designated space 120 that poses a threat of harm or injury to user 130. Risk condition 135 may be recognized by analysis of input data from cameras 165, microphone components of speakers 160, or other sensors, such as infra-red detecting sensors or vibration sensors (not shown). The trained machine learning model of risk fencing program 200 receives the input data and determines whether the input indicates a risk condition, such as risk condition 135. In some embodiments of the present invention, risk condition 135 can be but is not limited to, broken glass, a sharp object, a trip hazard, a slippery surface, a hot surface or item, unstable stacked items or structure, spilled medications, open access to a stairway or drop-off, a harmful chemical, and a dangerous animal, such as a poisonous snake.

FIG. 1 depicts IoT device 140 as a programmable robotic floor cleaning device that can receive instructions from risk fencing program 200 operating on computing device 110. The method recognizes a mobility aspect of IoT device 140 and, in some embodiments, determines that IoT device 140 resides in a storage location until receiving instructions to perform normal cleaning operations or instruction to intervene between user 130 and risk condition 135, forming a physical fence that provides a protective barrier. In some embodiments, risk fencing program 200 establishes a rate of movement of IoT device 140 and initiates instruction for IoT device 140 to form a fence barrier to risk condition 135 based on the learned movements and behaviors of user 130. In some embodiments, IoT device 140 forms a fence at a safe distance between risk condition 135 and user 130 based on the identification of user 130.

IoT device 145 is depicted in FIG. 1 as a programmable mobile device that can receive instructions from risk fencing program 200 operating on computing device 110. Embodiments acknowledge that IoT device 145 can be a robotic skateboard, a robotic toy vehicle, or a mobile, robotic assistant-type device. IoT device 145, resides in a storage location within designated space 120 and operates in response to user activity with IoT 145 or in response to receiving instructions to intervene between user 130 and risk condition 135, forming a physical fence that provides a protective barrier. In some embodiments, risk fencing program 200 establishes a rate of movement of IoT device 145 and initiates instruction for IoT device 145 to form a fence barrier to risk condition 135 based on the learned movements and behaviors of user 130. In some embodiments, IoT device 145 forms a fence as a barrier along with IoT device 140, at a safe distance between risk condition 135 and user 130 based on the identification of user 130.

IoT device 155 is depicted in FIG. 1 as a programmable mobile device that can receive instructions from risk fencing program 200 operating on computing device 110. FIG. 1 depicts IoT device 155 as a robotic ball-toy capable of movement by remotely received instructions. IoT device 155, resides in a storage location within designated space 120 and operates in response to user activity with IoT device 155 or in response to receiving instructions to intervene between user 130 and risk condition 135. In response to receiving programmable instructions, IoT device 155 moves to form a physical fence along with IoT device 145 and IoT device 140 that provides a protective barrier. In some embodiments, risk fencing program 200 establishes a rate of movement of IoT device 155 and initiates instruction for IoT device 155 to form a fence between user 130 and risk condition 135, based on the learned movements and behaviors of identified user 130.

In some embodiments of the present invention, IoT devices 140, 145, and 155 can be but are not limited to one or a combination of wirelessly controlled robotic toys (e.g., auto-rolling ball, robotic pet, robotic vehicle, etc.), robotic floor vacuum cleaner, robotic floor mop/rug shampoo device, remotely activated skateboard, robotic personal assistant, robotic lawnmower, robotic wagon, as well as other robotic devices able to receive wireless instructions for movement and navigation from risk fencing program 200.

Speakers 160 is a set of audio projecting devices connected to risk fencing program 200, operating on computing device 110, via wireless communication with router 125 and network 150. In some embodiments, speakers 160 include microphones, which receive audio input used to determine initiation of risk condition 135. In some embodiments, speakers 160 produce an audio response to distract and divert user 130 from risk condition 135. In some embodiments, speakers 160 provide audio guidance to user 130 to avoid risk condition 135, based on a digital audio assistant receiving input from risk fencing program 200. Based on the identification of user 130, speakers 160 may produce a startling sound or an annoying sound to deter user 130 from approaching risk condition 130.

Cameras 165 is a set of video-capturing devices that transmit video images of designated space 120 to risk fencing program 200 operating on computing device 110 by a wireless connection to router 125 and via network 150. Cameras 165 capture video images of changes to conditions in designated space 120 which, in some embodiments, includes images of risk condition 135 and images of user 130 as well as the movement of user 130. In some embodiments, cameras 165 may also operate as infra-red sensors that detect heat and heat sources within designated space 120.

Projector 170 is a light-emitting projector within designated space 120. In some embodiments, projector 170 illuminates risk condition 135 to provide visual awareness to user 130, based on the identification of user 130. In other embodiments in which illumination of risk condition 135 may attract user 130, projector 170 provides a distracting projection of light away from risk condition 135 to divert the movement of user 130 away from risk condition 135. In still other embodiments, projector 170 displays light as a visual part of the physical fence between risk condition 135 and user 130. In some embodiments, the displayed light may be an image or hologram that appears as part of the physical fence. In still other embodiments, projector 170 presents light displays or holograms to distract and divert user 130 from moving towards risk condition 135.

Figure 2:
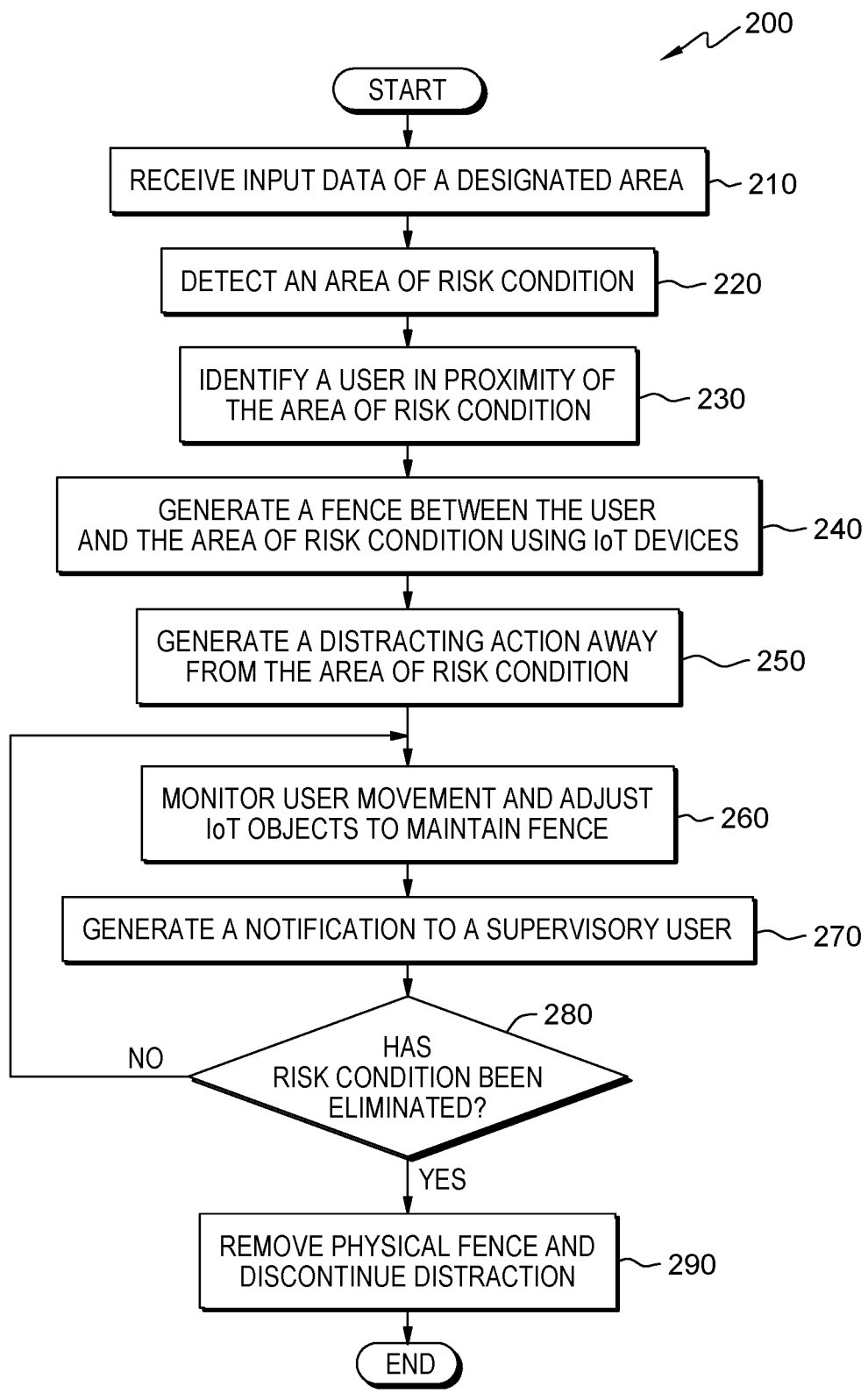
FIG. 2 is a flowchart depicting the operational steps of a risk protection program operating in the distributed computer processing environment of FIG. 1, in accordance with embodiments of the present invention.

FIG. 2 is a flowchart depicting the operational steps of risk fencing program 200 operating in distributed computer processing environment 100 of FIG. 1, in accordance with embodiments of the present invention.

Risk fencing program 200 receives input data of a designated space (step 210). In one embodiment of the present invention, risk fencing program 200 receives audio and video data as input from the monitoring of a designated space. In some embodiments risk fencing program 200 receives the audio and video input data and a machine learning model component of risk fencing program 200 analyzes the input data. Risk fencing program 200 detects and recognizes types of risk conditions that may occur within the designated space, based on the input data received and the machine learning training.

Risk fencing program 200 detects an area of risk condition (step 220). Risk fencing program 200 detects a risk condition within the designated space based on the machine learning model component of risk fencing program 200 analyzing the input data from audio and video input streams, such as from speakers 160 and cameras 165 of FIG. 1. Risk fencing program 200 includes machine learning training to recognize risk conditions from video images and audio input of the designated space. In some embodiments, risk fencing program 200 detects a risk condition, based on sensor data input, such as loss of lighting, excessive heat, detection of chemical fumes, and atypical vibration.

For example, risk fencing program 200 receives audio and video input that includes a loud sharp sound and images of many small, pointed pieces spread in a portion of the designated space. Risk fencing program 200 detects and recognizes, from machine learning training, a risk condition of a broken object of glass or ceramic material.

Risk fencing program 200 identifies a user in the proximity of the area of risk condition (step 230). Risk fencing program 200 receives video input of the designated space and determines the presence of a user within the designated space, or in some embodiments, determines an approach of a user to access the designated space. Confirming the presence of a user, risk fencing program 200 identifies the user in the proximity of the area in which a risk condition exists based on the video data received. In some embodiments, risk fencing program 200 uses the audio data received to identify the user, based on voice recognition and data received during the training of the machine learning model component of risk fencing program 200. In some embodiments, risk fencing program 200 identifies a category of the user as an infant, a toddler/child, or adult, based on the size of the user and the movement and behavior of the user from training data input. Risk fencing program 200 determines the movement capability and behavior of the user based on the identification of the user.

In some embodiments, if risk fencing program 200 determines that no users occupy or approach the designated space, then risk fencing program 200 sends an alert to a pre-determined recipient regarding the detection of a risk condition in the designated space.

Risk fencing program 200 generates a fence between the user and the area of risk condition using IoT devices (step 240). Risk fencing program 200 sends instructions to one or more IoT devices connected wirelessly to the computing device on which risk fencing program 200 operates. Risk fencing program 200 instructs the IoT devices to move to positions between the risk condition and the user identified in the designated space, creating a protective impeding fence. In one embodiment, risk fencing program 200 sends directional commands to the IoT devices and monitors movement of the IoT devices through input received from cameras 165. Risk fencing program 200 send adjustment commands, based on the monitored movements of the IoT devices positioning each device to form a physical fence barrier to the area of risk condition. For example, risk fencing program 200 sends instruction to IoT device 145 to move forward for 18 seconds, then turn 45 degrees to the right and proceed for 10 seconds, then turn 30 degrees and continue for another 5 seconds and stop. Each command based on the position of IoT device at the end of the previous command.

In some embodiments, risk fencing program 200 determines a safe distance at which to establish the IoT device fence, based on the identification of the user and the recognition of the type of risk condition. In some embodiments, risk fencing program 200 provides an illumination of the risk condition to facilitate recognition of the risk condition by the user. In other embodiments, risk fencing program 200 projects lighting away from the risk condition as a distraction diverting the user away from the risk condition. In some embodiments, risk fencing program 200 projects light images or holograms as part of the fencing to present the image of a more extensive barrier between the user and the risk condition.

Risk fencing program 200 generates a distracting action away from the area of risk condition (step 250). In addition to generating the fencing between the user and the risk condition by using mobile IoT devices as a physical barrier, risk fencing program 200 generates a distraction away from the area of risk condition to divert the user. In some embodiments, the diversion may be an audio diversion from speakers positioned away from the area of risk condition, intended to attract the user towards the audio diversion, such as appealing music or a familiar voice. In other embodiments, the audio sound may be a startling noise or annoying sound from a speaker near the risk condition, intending to repulse or repel the user away from the risk condition. In other embodiments, risk fencing program 200 projects lighting away from the risk condition as a distraction and may include a projection of a hologram, diverting the user towards the lighting and away from the risk condition.

Risk fencing program 200 monitors the user's movements and adjusts the IoT objects to maintain the fence (step 260). Risk fencing program 200 continues to receive audio and video monitoring of the designated space and determines the movements of the user. Risk fencing program 200 provides instruction to the IoT devices to form the fencing between the user and the risk condition, adjusting the fencing to correspond to the movements of the user maintaining a continuous barrier.

Risk fencing program 200 generates a notification to a supervisory user (step 270). In some embodiments, risk fencing program 200 also generates a notification to a pre-determine supervisory user about the detection of a risk condition in the designated space and the presence of the user. In some embodiments, the notification may be in the form of a short message service (SMS) text message sent to the supervisory user, in other embodiments the notification may be an alert message sent to a smart device of the supervisory user. In other embodiments, risk fencing program 200 sends the notification by an audio alert through a voice assistant device, a public address (PA) system, or an alarm.

Risk fencing program 200 determines whether the risk condition has been eliminated (decision step 280). Risk fencing program 200 monitors the designated space by video and audio input and in some embodiments, by use of sensor devices. Risk fencing program 200 determines whether the input data indicates that the risk conditions have been eliminated by the absence of detection of the indicators of the risk condition. In some embodiments, an intervening user may manually provide a reset of risk fencing program 200. For the case in which risk fencing program 200 determines that the risk condition remains (step 280, "NO" branch), risk fencing program 200 returns to step 260 and continues to monitor the movements of the user, adjusting the position of the IoT devices to maintain the fence and proceeds as described above.

For the case in which risk fencing program 200 determines that the risk condition has been eliminated (step 280, "YES" branch), risk fencing program 200 proceeds to remove the fence deployed between the user and the risk condition and discontinue providing distractions (step 290). Risk fencing program 200 provides instruction to the IoT devices to discontinue the fence as a barrier to the user and provides instruction to return the IoT devices to respective designated positions. Additionally, risk fencing program 200 provides instruction to discontinue the distractions to divert the user. Having removed the fencing and discontinued the distractions, risk fencing program 200 ends.

Figure 3:
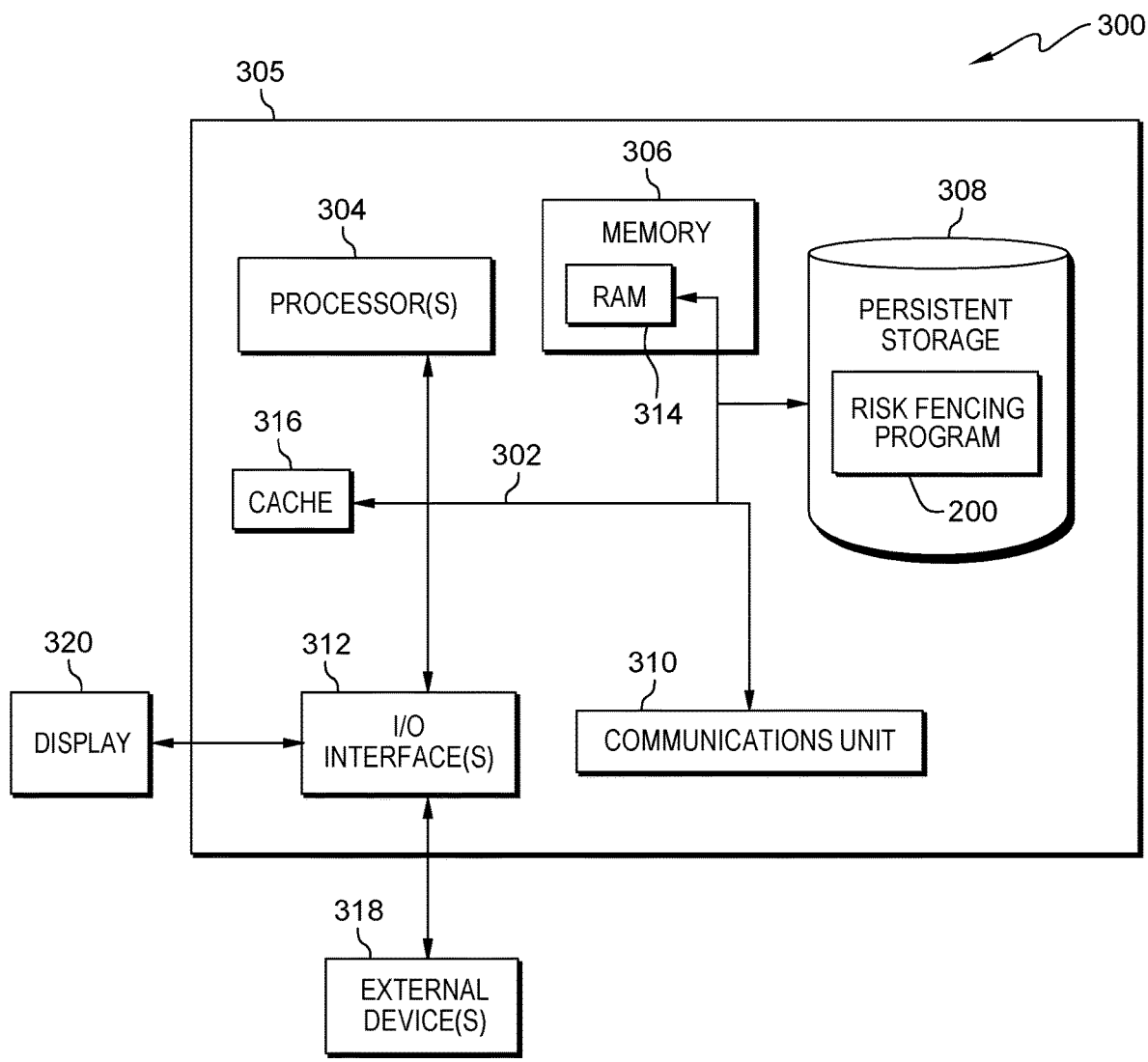
FIG. 3 depicts a block diagram of components of a computing system, including a computing device configured to operationally perform the risk protection program of FIG. 2, in accordance with an embodiment of the present invention.

FIG. 3 depicts a block diagram of components of computing system 300, including computing device 305, configured to include or operationally connect to components depicted in FIG. 1, and with the capability to operationally perform sound selection program 200 of FIG. 2, in accordance with an embodiment of the present invention.

Computing device 305 includes components and functional capability similar to components of computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, risk fencing program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed computer processing environment 100. In these examples, communications unit 310 includes one or more network interface cards. Communications unit 310 may provide communications through the use of either or both physical and wireless communications links. Risk fencing program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., risk fencing program 200 can be stored on such portable computer-readable storage media and can be loaded onto persistent storage 308 via I/O interface(s) 312. I/O interface(s) 312 also connects to a display 320.

The foregoing description is an example of embodiments of the invention, and variations and substitutions can be made in implementations without detracting from the novel aspects of the embodiments.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for blocking a user from an area of risk, the method comprising:
    receiving, by one or more processors, input data from monitoring of a designated space;
    detecting, by the one or more processors, an area of risk condition within the designated space, based on machine learning of the designated space and predetermined indicators of a risk condition;
    identifying, by the one or more processors, a user in a proximity of the area of the risk condition within the designated space, based on machine learning of historical video images of the user within the designated space;

transmitting, by the one or more processors, instructions to one or more Internet of things (IoT) devices to move to a position to form a fence between the area of the risk condition and the user;

generating, by the one or more processors, a distraction diverting the user away from the area of the risk condition; and in response to determining movements of the user approaching the area of the risk condition, adjusting, by the one or more processors, the position of the one or more IoT devices corresponding to the movements of the user to maintain the fence as a barrier between the user and the area of the risk condition.

2. The computer-implemented method of claim 1, wherein the pre-determined indicators of the risk condition and pre-determined areas within the designated space are identified based on a machine learning model trained by supervised learning using images of risk conditions, images of areas within the designated space, and indicators from sensor-based input.

3. The computer-implemented method of claim 1, further comprising:

determining, by the one or more processors, a safe distance of the user from the area of risk condition on which to position deployment of the one or more mobile IoT devices to form the fence between the user and the area of risk condition.

4. The computer-implemented method of claim 1, wherein a rate of movement and movement behavior of the user are learned by a machine learning model, based on video analysis of historic video and audio input data of the user within areas of the designated space.

5. The computer-implemented method of claim 1, wherein deploying the one or more IoT devices intervening between the user and the area of risk condition includes projecting a light-based fencing augmenting the one or more IoT devices.

6. The computer-implemented method of claim 1, wherein generating the distraction includes emitting an attracting audio signal from a direction away from the area of risk condition.

7. The computer-implemented method of claim 1, wherein generating the distraction includes emitting an attracting visual display in a direction away from the area of risk condition.

8. The computer-implemented method of claim 1, further comprising:

in response to determining the risk condition is eliminated, removing, by the one or more processors, the fence formed by the one or more IoT devices and terminating the distraction diverting the user from the area of the risk condition.

9. A computer program product for blocking a user from an area of risk, the method comprising:

one or more computer-readable storage media, and program instructions stored on the one or more computer-readable storage media, the program instructions comprising:

program instructions to receive input data from monitoring of a designated space;

program instructions to detect an area of risk condition within the designated space, based on machine learning of the designated space and pre-determined indicators of a risk condition;

program instructions to identify a user in a proximity of the area of the risk condition within the designated space, based on machine learning of historical video images of the user within the designated space;

program instructions to transmit instructions to one or more Internet of things (IoT) devices to move to a position to form a fence between the area of the risk condition and the user;

program instructions to generate a distraction diverting the user away from the area of the risk condition; and in response to determining movements of the user approaching the area of the risk condition, program instructions to adjust the position of the one or more IoT devices corresponding to the movements of the user to maintain the fence as a barrier between the user and the area of the risk condition.

10. The computer program product of claim 9, wherein program instructions to identify the pre-determined indicators of the risk condition and pre-determined areas within the designated space are identified based on a machine learning model trained by supervised learning using images of risk conditions, images of areas within the designated space, and indicators from sensor-based input.

11. The computer program product of claim 9, wherein program instructions to determine a rate of movement and movement behavior of the user are learned by a machine learning model, based on video analysis of historic video and audio input data of the user within areas of the designated space.

12. The computer program product of claim 9, wherein program instructions to deploy the one or more IoT devices intervening between the user and the area of risk condition includes projecting a light-based fencing augmenting the one or more IoT devices.

13. The computer program product of claim 9, wherein program instructions to generate the distraction includes emitting one or a combination from a group consisting of an attracting visual display and an attracting audio signal from a direction away from the area of risk condition.

14. A computer system for blocking a user from an area of risk, the method comprising:

one or more computer processors;

one or more computer-readable storage media, and program instructions stored on the one or more computer-readable storage media, the program instructions comprising:

program instructions to receive input data from monitoring of a designated space;

program instructions to detect an area of risk condition within the designated space, based on machine learning of the designated space and pre-determined indicators of a risk condition;

program instructions to identify a user in a proximity of the area of the risk condition within the designated space, based on machine learning of historical video images of the user within the designated space;

program instructions to transmit instructions to one or more Internet of things (IoT) devices to move to a position to form a fence between the area of the risk condition and the user;

program instructions to generate a distraction diverting the user away from the area of the risk condition; and in response to determining movements of the user approaching the area of the risk condition, program instructions to adjust the position of the one or more IoT devices corresponding to the movements of the user to maintain the fence as a barrier between the user and the area of the risk condition.

15. The computer system of claim 14, wherein program instructions to identify the pre-determined indicators of the risk condition and pre-determined areas within the designated space are based on a machine learning model trained by supervised learning using images of risk conditions, images of areas within the designated space, and indicators from sensor-based input.

16. The computer system of claim 14, further comprising:
program instructions to determine a safe distance of the user from the area of risk condition on which to position deployment of the one or more mobile IoT devices to form the between the user and the area of risk condition.

17. The computer system of claim 14, wherein program instructions to determine a rate of movement and movement behavior of the user are learned by a machine learning model, based on video analysis of historic video and audio input data of the user within areas of the designated space.

18. The computer system of claim 14, wherein program instructions to deploy the one or more IoT devices intervening between the user and the area of risk condition include projecting a light-based fencing augmenting the one or more IoT devices.

19. The computer system of claim 14, further comprising:
in response to determining the risk condition is eliminated, program instructions to remove the fence formed by the one or more IoT devices and terminate the distraction diverting the user from the area of the risk condition.

20. The computer system of claim 14, wherein program instructions to generate the distraction includes emitting one or a combination from a group consisting of an attracting visual display and an attracting audio signal from a direction away from the area of risk condition.

* * * * *